UNITED STATES PATENT OFFICE.

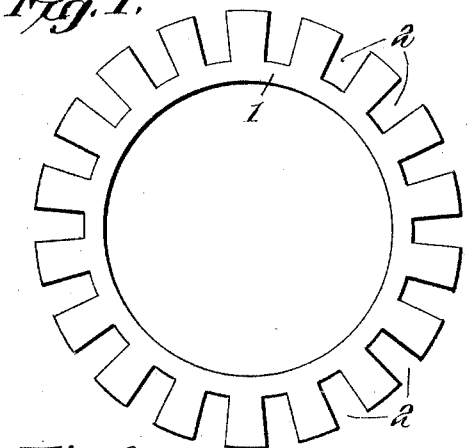
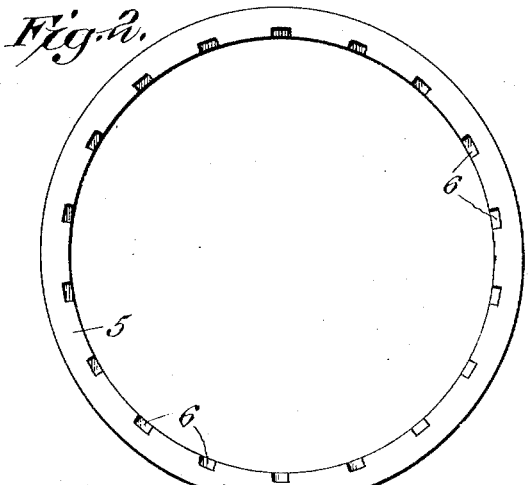
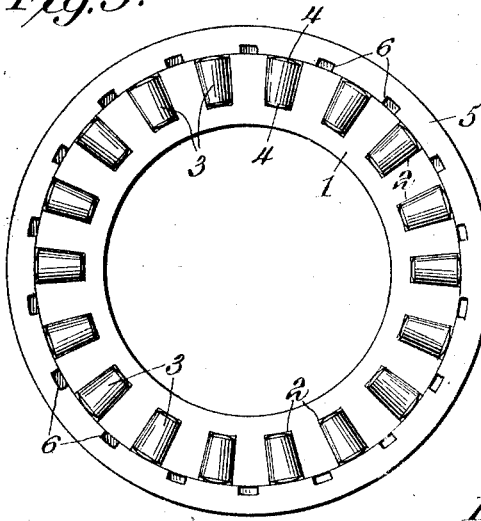
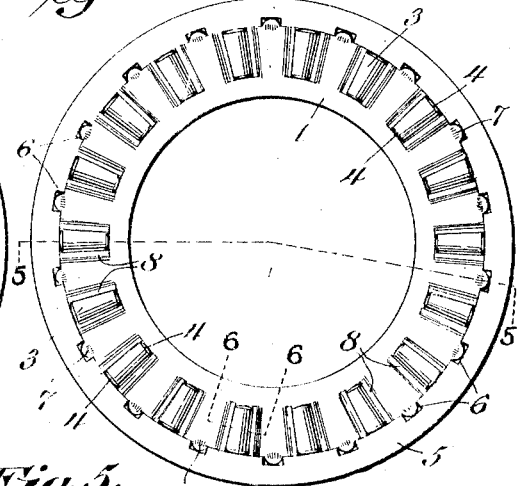
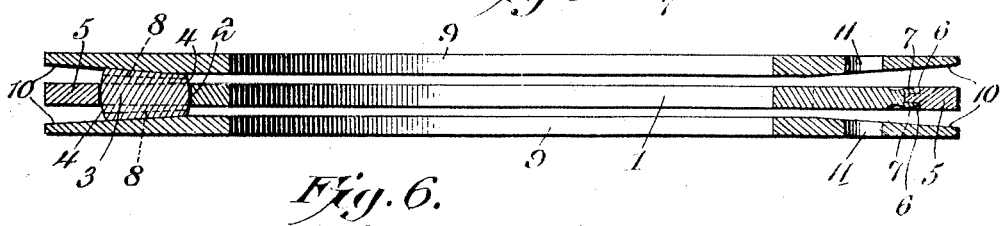
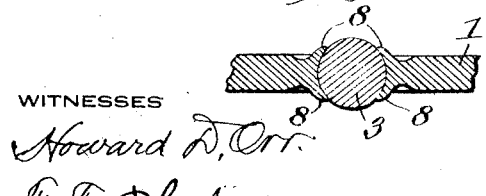

JOHN WOODARD SIMMONS, OF CLEVELAND, OHIO.

ROLLER THRUST-BEARING.

1,334,266.  Specification of Letters Patent.  Patented Mar. 16, 1920.

Application filed May 13, 1919. Serial No. 296,871.

*To all whom it may concern:*

Be it known that I, JOHN W. SIMMONS, a citizen of the United States, residing at Cleveland, in the county of Cuyahoga and State of Ohio, have invented a new and useful Roller Thrust-Bearing, of which the following is a specification.

This invention has reference to roller thrust bearings particularly adapted for automobile differential gearing, and its object is to provide a bearing for the purpose, so constructed as to include a minimum number of parts and to be susceptible of assembly in a simple and particularly efficient manner.

In certain types of automobiles, particularly in the Ford and other similar automobiles it is the customary practice to provide a thrust bearing, for the differential gearing, composed of two annular steel plates, or washers with a brass or Babbitt metal annulus between them to reduce friction and wear. The reduction in friction is marked but the thrust bearing so made is relatively short lived and in many cases must be renewed when the vehicle has run only about five thousand miles, more or less.

In accordance with the invention the thrust bearing comprises a single plate with a peripheral roller-retaining ring of particularly resistant metal, the plate being of soft and relatively ductile metal while the cage is flanked by bearing plates arranged on opposite sides of the roller cage.

The invention has the advantage over similar bearings not only in the minimum number of parts but in the readiness of assembly and the resisting character of the structure to wear.

The invention will be best understood from a consideration of the following detailed description taken in connection with the accompanying drawing forming part of this specification, with the understanding, however, that the invention is not confined to any strict conformity with the showing of the drawing, but may be changed and modified so long as such changes and modifications mark no material departure from the salient features of the invention as expressed in the appended claims.

In the drawing:—

Figure 1 is a face view of the roller-housing part of the roller cage.

Fig. 2 is a face view of the ring for holding the rollers in place.

Fig. 3 is a face view of the roller housing plate and ring assembled, with the rollers placed.

Fig. 4 is a view similar to Fig. 3, but showing a further step in the assemblage of the roller bearing.

Fig. 5 is a section on the line 5—5 of Fig. 4, but drawn on a larger scale.

Fig. 6 is a section on the line 6—6 of Fig. 4.

Referring to the drawing, there is shown an annulus 1 in the form of a relatively thick plate, with a circular series of peripheral slots 2 opening outwardly, the slots being of segmental form or tapering toward the center of the plate. The slots 2 are each of an appropriate size to receive a roller 3 of taper form and the ends of the rollers may, if desired, be slightly rounded as indicated at 4, thereby correspondingly reducing friction. The plate 2 is of a thickness such that the rollers will project beyond opposite faces thereof when properly seated in the plate.

Before the rollers 3 are placed in the plate a ring 5, which may be of case-hardened metal, is forced tightly upon the plate about the periphery thereof so as to close the slots 2 and firmly hug the plate, thereby providing a thrust bearing or abutment for the outer ends of the rollers 3. The ring 4 has formed in it at its inner periphery, at opposite faces of the plate, a circular series of notches or recesses 6 and when the ring 5 is properly lodged on the plate 1 the metal of the plate 1 is punched or upset into the recesses 6 to provide lips 7 entering the recesses so that the plate and the ring are firmly anchored together. The rollers are thereby prevented from movement longitudinally of the rollers in the recesses 2, the arrangement being such that the rollers have no material end play but do not bind at the ends in the recesses. In order to hold the rollers from escape from the cage made up of the plate 1 and ring 5, the side or radial walls of the recesses 2 are upset or punched to produce radial tongues 8 on opposite sides of the plate 1 in partial embracing relation to the rollers 3. In this manner the rollers are firmly held in the recesses by the tongues 8 but these tongues are so arranged as to not bind on the rollers, wherefore the latter may turn freely without any particular lost motion.

The lips 7 and tongues 8 may be readily formed because of the softness or ductility of the annulus 1, which may be made of relatively soft steel, while the ring 5 is casehardened and so withstands the wear of the rollers 3 thereon, which rollers tend to thrust outwardly against the inner edge of the ring 5.

The roller cage with the rollers therein and secured in place is lodged between two plates 9, which may be annular plates, and these plates have one face between the inner and outer peripheries beveled, as shown at 10, in conformity with the taper or bevel of the rollers 3. It is customary to provide the plates 9 with one or more perforations 11 whereby the thrust bearing is held in position in the machine in which it is used so that the two plates 9 turn with the parts between which they are located and consequently all thrust wear is borne by the plates 9 and rollers 3.

The thrust bearing is a simplified structure comprising a single retainer plate 1 of relatively soft and ductile metal radially slotted and surrounded by a case-hardened retainer ring, with the metal of the plate pressed out therefrom into recesses or sockets in the ring, thereby making it impossible to remove the ring without practically destroying the part. Furthermore, the rollers, which are also case-hardened, are held in the plate not only by the ring 5 but by the struck-out tongues 8. Moreover, the radius of each roller is such that it forms an effective ball-bearing contact between the outer end of the roller and the case-hardened ring. Since the lips 7 enter the recesses 6 on opposite sides of the ring 5, the plate 1 and ring 5 are securely locked together against any liability of separation.

The structure is such that the parts may not only be cheaply and expeditiously formed but it is possible to readily assemble the structure, while the employment of relatively soft and case-hardened parts is feasible. This permits those parts liable to wear to be made extremely hard but the other parts not so subject to wear may be secured together by integral portions, thereby avoiding the use of bent over tongues or of rivets. The structure contributes materially to the strength of the bearing, to the ease of assembly and to the certainty of fastening the parts together against liability of accidental separation.

The parts making up the bearing are all susceptible of being stamped while the ring surrounding the retainer plate is case-hardened and hydraulically or otherwise powerfully forced on the retainer plate and is there locked by tongues partly punched out of the retainer plate into recesses on the case-hardened ring on opposite sides of the plate. The taper rollers are inserted in the partly assembled ring and flanges or tongues of metal are forced up about these rollers on both sides thereof. By making the thickness of the retainer plate and ring about the same and somewhat less in thickness, say about two-thirds that of the rollers, an effective roller bearing is provided, permitting the retainer plate 1 to be made of comparatively heavy material and therefore withstand all strains to which it is liable.

What is claimed is:—

1. The method of forming roller thrust bearings, which consists in providing a relatively soft retainer plate with roller-receiving slots therein open at the outer ends, then forcing a case-hardened ring, with recesses therein, about the peripheral portion of the plate and thereby closing the outer ends of the slots, then upsetting the metal of the plate into the recesses in the ring on both sides thereof, then placing rollers in the slots, and finally forcing the metal of the plate into partly embracing relation to the rollers, whereby the plate and ring are locked together and the rollers are seated securely in the recesses.

2. The method of forming roller thrust bearings, which consists in providing a roller carrying plate, forcing a ring about the peripheral portion of the plate to provide outer thrust supports for the rollers, upsetting the metal of the plate into opposite faces of the ring, and upsetting the metal of the plate into embracing relation to opposite side portions of the rollers to hold said rollers in the plate, leaving diametrically opposite parts of the rollers free.

3. A roller thrust bearing comprising a body plate with radial slots opening at the periphery thereof, a ring embracing the body plate and provided with a circular series of recesses on its inner periphery with the metal of the plate upset into the recesses to lock the plate and ring together, rollers lodged in the slots in the plate with the metal of the plate upset along the slots and opposite sides of the plate to hold the rollers in place, and thrust plates on opposite sides of the first-named plate and of the rollers.

4. A roller thrust bearing comprising a single body plate with radial peripherally located entering slots, taper rollers in the slots with the body of the plate upset on opposite sides of the slots and faces of the plate to partially embrace the rollers and hold them in the slots, a ring peripherally embracing the plate and constituting the outer end walls of the slots and for the rollers, and the plate and ring being locked together by integral portions of the plate, and face plates on opposite sides of the first-named plate and in engagement with the rollers, those faces of the second plates engaging the rollers being beveled in conformity with the taper of the rollers.

In testimony, that I claim the foregoing as my own I have hereto affixed my signature.

JOHN WOODARD SIMMONS.

Witnesses:
A. M. PAPURT,
C. F. GRATH.